(No Model.) 2 Sheets—Sheet 1.

G. W. NICHOLS.
Mechanism for Oscillating the Slides of Gang Saws.

No. 241,700. Patented May 17, 1881.

Witnesses
Thomas J. Bewley
Ruslig Hannigen

Inventor
George W. Nichols.
per Stephen Usick, att'y (No Model.)
2 Sheets—Sheet 2.
G. W. NICHOLS.
Mechanism for Oscillating the Slides of Gang Saws.
No. 241,700. Patented May 17, 1881.
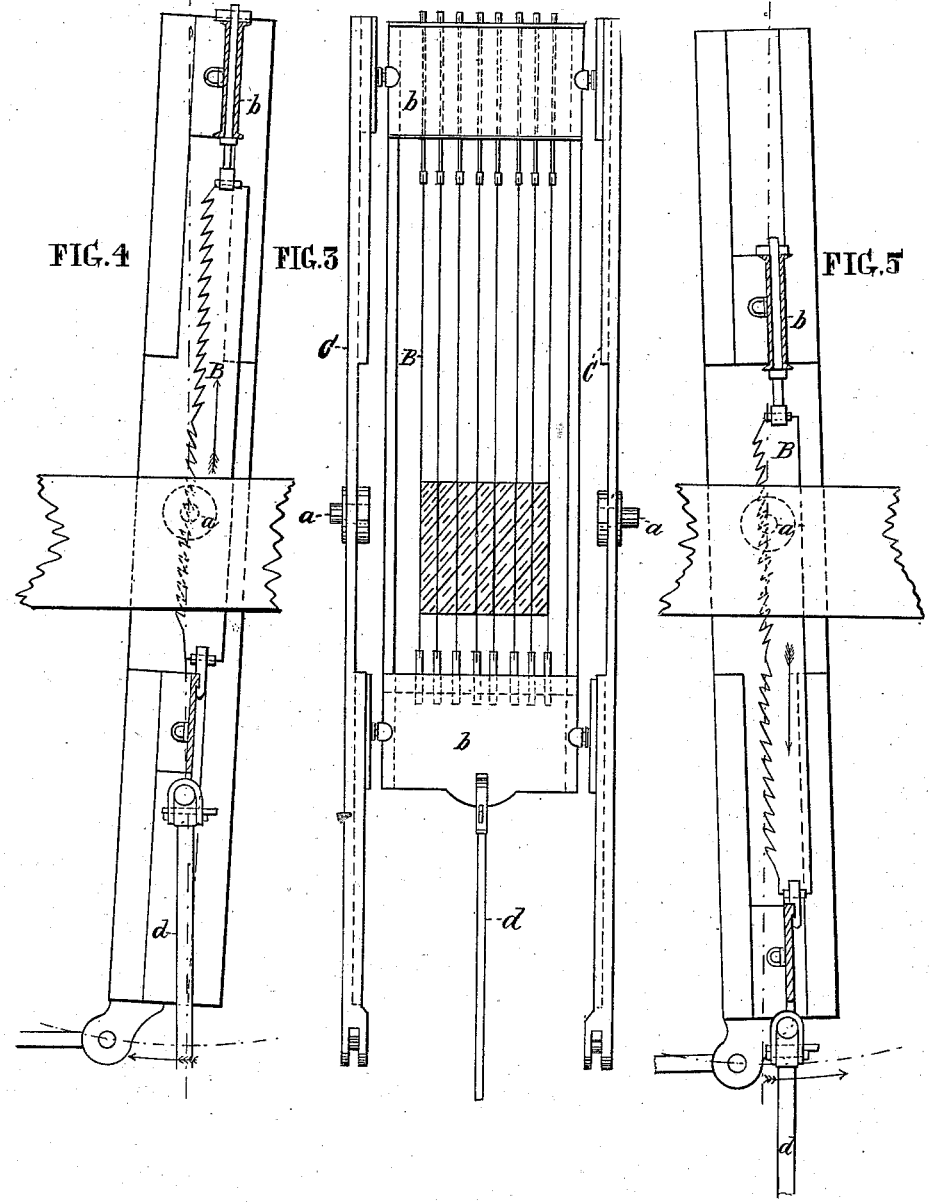
Witnesses
Thomas J. Bewley
Rusling Flanigen
Inventor.
George W. Nichols,
per Stephen Ustick, att'y

UNITED STATES PATENT OFFICE.

GEORGE W. NICHOLS, OF CLINTON, ASSIGNOR OF ONE-HALF TO THE NOVELTY IRON WORKS, OF DUBUQUE, IOWA.

MECHANISM FOR OSCILLATING THE SLIDES OF GANG-SAWS.

SPECIFICATION forming part of Letters Patent No. 241,700, dated May 17, 1881.

Application filed October 4, 1880. (No model.)

*To all whom it may concern:*

Be it known that I, GEORGE W. NICHOLS, a citizen of the United States, residing at Clinton, in the county of Clinton and State of Iowa, have invented a new and useful Improvement in Oscillating the Slides of Gang-Saw Frames, of which the following is a specification.

Hitherto double-cut saws having an oscillatory movement have had their cutting-edge of a rake or curved form, to give a clearance to their cuts in both their up and down movements.

To make it practicable to accomplish the clearance with double-cut straight saws is the object of my invention; and the nature of my invention consists in the combination of the saw-frame slides with the side frames or housings by means of pivots at or about the middle of the length of the slides, so that by the oscillation of the slides at that point they are reversed in their inclination at the up and down positions of the saw-frame by mechanism hereinafter described, so as to give clearance to the cut of the saw in both their up and down movements, as hereinafter fully described.

Figure 1:
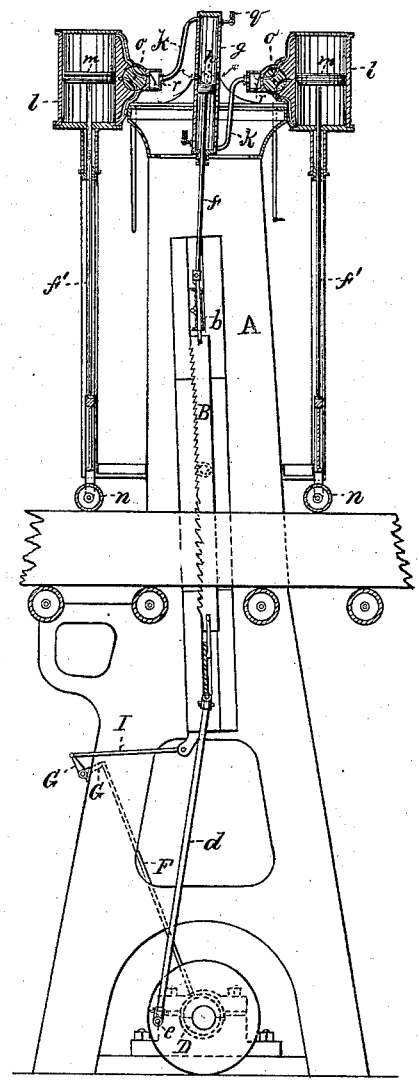
Figure 2:
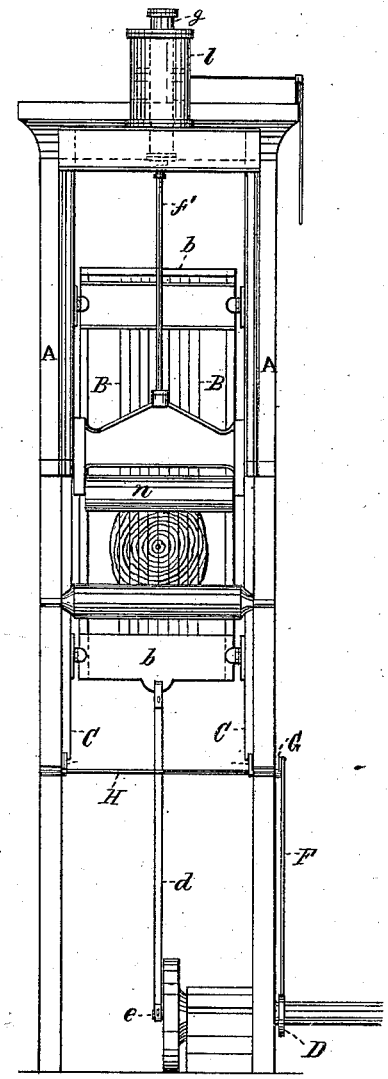

In the accompanying drawings, which make a part of this specification, Figure 1 is a side elevation of a gang of double-cut saws and parts connected therewith, one of the side frames, A, being removed. Fig. 2 is a front elevation of the same. Fig. 3, Sheet No. 2, is a front view, on an enlarged scale, of a gang of double-cut saws, B, the reciprocating frame $b$, to which they are attached, and their pivotal slides C C. Figs. 4 and 5 are edge views of the saw-frame $b$, with the saws in their upward and downward positions respectively at reverse inclination from the perpendicular plane, and $x$ $x$ showing, in an exaggerated manner, the mode of clearance in the cut of the saws in both their upward and downward movements.

Like letters of reference in all the figures indicate the same parts.

The saws B are connected with the frame $b$ in the usual manner. The slides C C, in which the frame $b$ has its up and down movements, are provided with pivots $a$ $a$ at or about the middle of their length, which have their bearings in the housings or side frames, A, of the mill, to provide for the oscillating movements of the slides, which may be effected by any suitable means. In the present case the oscillation is produced by means of the eccentric D, its rod F, bell-cranks G G, and their connecting-rods H and I I, as seen in Figs. 1 and 2. The saw-frame $b$ has its reciprocating movements given by means of the pitman $d$ and crank-pin $e$.

At the upper end of the saw-frame there is an air-cushion compression-cylinder, $g$, having a piston, $h$, provided with a rod, $f$, which is connected with the upper end of the frame $b$, for assisting in reversing the movements of said frame. In order that the piston-rod $f$ shall always be in line with the saw-frame $b$, the cylinder $g$ is adapted to oscillate in a corresponding manner to that of the frame, as shown in Fig. 1.

Similar air-compression cylinders, $l$ $l$, having pistons $m$ $m$, provided with rods $f'$ $f'$, are also used to give a yielding pressure to the rollers $n$ $n$. The cylinders $l$ $l$ receive their air from the said cylinder $g$ by means of the pipes K K, which are provided with the valves $o$, $q$, and $r$, for respectively controlling the action of the pistons $m$ $m$, regulating or controlling the pressure of the air, and checking the escape of air through the pipes. As these cylinders $g$ $l$ $l$ and their connecting devices are shown and claimed in another application of mine, a further description is deemed unnecessary.

I claim as my invention—

The slides C C of gang-saw frames, having pivots $a$ $a$ at or about the middle of their length, in combination with the side frames or housings and the saw-frame $b$, to admit of the saws being brought in their up and down movements respectively on reverse inclinations from a vertical plane, whereby to give clearance of double-cut straight saws in both their up and down movements, the operation of the slides being effected by means of the eccentric D, rod F, bell-cranks G G, and connecting-rods H I I, or other suitable devices, substantially as described.

GEORGE W. NICHOLS.

Witnesses:
CHARLES W. CHASE,
LE ROI B. WADLEIGH.